Oct. 20, 1970    H. S. KATZENSTEIN    3,535,613
COMPENSATED SOLID STATE VOLTAGE REGULATOR CIRCUIT INCLUDING
TRANSISTORS AND A ZENER DIODE
Filed March 11, 1968
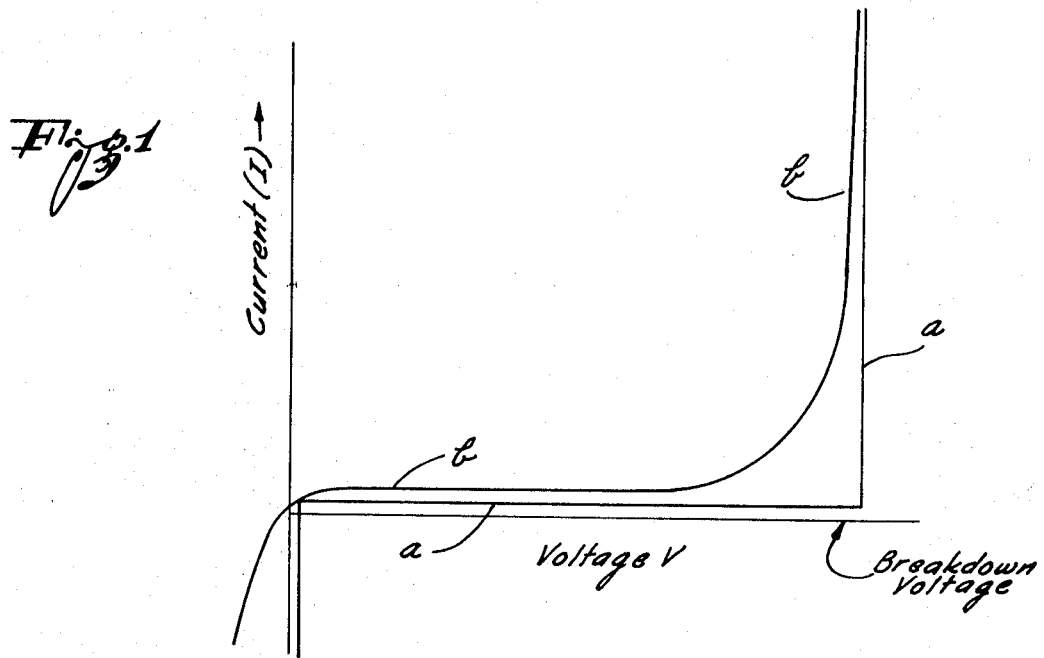
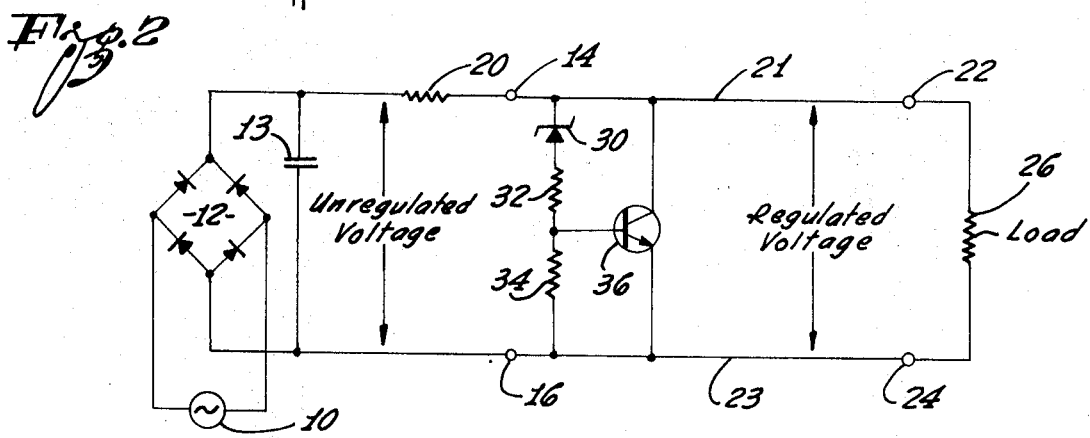
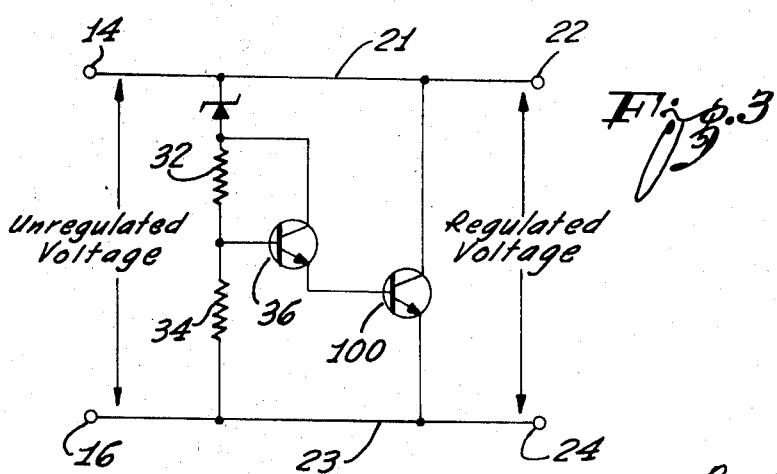
INVENTOR:
Henry S. Katzenstein
Jessup and Beecher
Keith D. Beecher
ATTORNEYS United States Patent Office 3,535,613
Patented Oct. 20, 1970

3,535,613
COMPENSATED SOLID STATE VOLTAGE REGULATOR CIRCUIT INCLUDING TRANSISTORS AND A ZENER DIODE
Henry S. Katzenstein, Pacific Palisades, Calif., assignor to Solid State Radiations, Inc., West Los Angeles, Calif., a corporation of Delaware
Filed Mar. 11, 1968, Ser. No. 711,992
Int. Cl. G05f 3/14
U.S. Cl. 323—8                                    2 Claims

ABSTRACT OF THE DISCLOSURE

A solid state voltage regulator circuit which operates satisfactorily to regulate relatively high voltages in the range, for example, of 100–300 volts. The voltage regulator circuit includes the combination of a Zener diode and a transistor, with the Zener diode being used to regulate the current through the transistor in a manner such that the Zener diode itself does not absorb the full energy during the regulation process.

BACKGROUND OF THE INVENTION

Semiconductor devices known as "Zener" diodes, avalanche diodes or breakdown diodes are commonly employed as voltage regulating devices, voltage references, or in direct coupled amplifier circuits for effecting a change in the direct current reference level. These devices conduct a small, usually negligible current in the reverse bias direction for applied voltages less than a threshold value for a given device. However, when the voltage across the device is increased beyond the threshold value, the current flow through the device increases very rapidly.

Therefore, if the voltage source has a finite resistance, the voltage across the aforesaid semiconductor device tends to remain substantially constant for source voltages above the characteristic breakdown threshold value. This constant voltage property of the Zener diode has been exploited in electronic circuits in the past to produce constant voltage power supplies as well as any number of other applications, well known to the art. The usual Zener diode, or the like, is used almost universally for voltage regulating purposes, in conjunction with source voltages, for example, under 100 volts.

However, for the regulation of the higher voltages, for example, of over 100 volts, the gas regulator tube is still in general use. This is because, despite the limited life and relatively high cost of the gas regulator tube, the Zener diode does not operate satisfactorily at the higher voltages. Specifically the Zener diode exhibits a poor temperature coefficient which becomes more and more troublesome for the higher voltages. Likewise, the relatively poor surface characteristics and poor heat transfer characteristics of the Zener diode become aggravated when it is attempted to use such a device to regulate voltages, for example, in excess of 100 volts. Moreover, other solid state regulating circuits, prior to the present invention, for the most part have been relatively complicated and expensive, when used in conjunction with voltages above the 100 volt level.

The solid state voltage regulator circuit of the present invention uses a transistor to carry the bulk of the current during discharge and to absorb the bulk of the power. In the voltage regulator circuit of the present invention, a Zener diode is used merely as a control element, with minimum amount of current actually passing through the Zener diode during the voltage regulating process. For example, when the line voltages rise above the regulated voltage threshold in the prior art type of Zener shunt regulating circuits, the Zener diode breaks down and all the power is absorbed in the Zener diode. On the other hand, in the circuit of the present invention, the Zener diode responds to a small part of the current merely to control the discharge of the associated transistor.

As mentioned above, the poor heat transfer characteristics of the Zener diode are such that at the higher voltages heating of the device becomes a problem, and this leads to thermal instability. This thermal instability becomes sufficiently severe at the higher voltages, that the use of the Zener diode as a shunt voltage regulator device becomes impractical, so that its use is limited usually to voltages under 100 volts, as mentioned previously. This has resulted in the use of the more expensive and generally less satisfactory gas regulator tube in the regulation of voltages in the range, for example, of 100–300 volts.

In the solid state voltage regulator circuit of the present invention, a transistor is used to absorb the major portion of the power during the voltage regulation process. The transistor is preferably an NPN transistor, and it exhibits a negative temperature coefficient at its emitter-base junction. A Zener diode is used, as explained, merely as a control element for the transistor. The Zener diode itself exhibits a positive temperature coefficient. In order to balance the negative temperature coefficient of the transistor with the positive temperature coefficient of the Zener diode, a pair of resistors may be used in the circuit to match the two temperature coefficients. In this way, the overall temperature coefficient of the voltage regulating circuit can be such that there are no appreciable changes in the circuit parameters due to heating effects, so that the spurious voltage regulating operations due to thermal instability are minimized.

Another factor which militates against the use of the Zener diode as a shunt regulator for the higher voltages, is the poor surface characteristics of the Zener diode in the breakdown region. That is, the current-voltage characteristic of the Zener diode in the voltage breakdown region is irregular. When the Zener diode is used to absorb all the power in the performance of its voltage regulating function, the device must operate over the full sweep of its current-voltage characteristic at the breakdown region. This results in instability in the operation of the device. In the circuit of the present invention, however, the characteristics of the Zener diode can be tolerated, since it operates over only a small portion of its current-voltage characteristic in the performance of its control function for the associated transistor.

BRIEF DESCRIPTION OF THE DRAWINGS

FIG. 1 is a curve illustrative of the voltage/current characteristic of a typical Zener diode;

FIG. 2 illustrates one embodiment of the voltage regulating circuit of the present invention incorporated into a typical power supply system; and FIG. 3 is a fragmentary diagram illustrating a second embodiment of the voltage regulating circuit of the invention.

DETAILED DESCRIPTION OF THE ILLUSTRATED EMBODIMENT

The curve $a$ of FIG. 1 illustrates the ideal characteristic for a Zener diode. Below the breakdown voltage, for example, there is no current flow through the device; and at the breakdown voltage, an arbitrarily high current is passed by the device with no increase of voltage drop. However, the usual commercial Zener diode displays a characteristic such as shown by the curve $b$ of FIG. 1. As the breakdown voltage is approached, a nonnegligible current begins to flow through the device due to surface leakage or variations of the breakdown voltage over the junction area of the device.

As the breakdown voltage is passed, the current does not increase without limit, but a finite, though increased slope in the current versus voltage characteristic is manifested. The incremental slope of this characteristic ($dV/dI$) is known as the dynamic impedance of the Zener diode. For the ideal device, this dynamic impedance is zero. However, for the usual commercial Zener diode, the dynamic impedance can range from a few ohms to several thousand ohms, depending on the size of the junction, the breakdown voltage, and the current.

For example, in a typical commercial device having a breakdown voltage of 100 volts, the dynamic impedance is of the order of 500 ohms for currents of 10 milliamps to 5,000 ohms for currents of 1 milliamp. This relatively high and variable dynamic impedance limits the usefulness of the Zener diode. Furthermore, Zener diodes of large junction area and high current capabilities tend to have poor dynamic impedance characteristics at low currents, requiring wasteful stand-by current to be required under normal low current conditions. Because of the large junction area in high current devices, undesirable currents flow at voltages less than the normal breakdown voltage.

The aforesaid characteristics of the Zener diode limit its usefulness, for example, to voltages below the 100 volt level, for example. The circuit of the present invention is one exhibiting the nearly ideal voltage-current characteristic of a Zener diode, while minimizing the undesired effects of large variable dynamic impedance, pre-breakdown current, and limited useful current range. Moreover, the voltage regulator circuit of the present invention serves to improve the power dissipation characteristics and temperature dependence characteristics of the Zener diode, while maintaining the essential simplicity of a two terminal constant-voltage network.

An important feature of the invention is that it permits the construction of inexpensive devices of vastly improved characteristics with greater ease and control of important parameters than is the case with the usual prior art Zener diode. The circuit to be described depends on utilization of only a small selected portion of the breakdown characteristic of a conventional Zener diode, and amplifies the resulting output to cover any desired current range. The schematic representation of one embodiment of the circuit of the present invention is illustrated in FIG. 2. It is to be understood that while the network shown in FIG. 2 is illustrated as an interconnection of discrete semiconductor and resistance elements for the sake of clarity of description, the particular illustration should not be construed as excluding the formation of the circuit either by monolithic circuit techniques or hybrid, semiconductor-discrete component techniques, depending on the application and the production requirements for the circuit.

The circuit of FIG. 2 shows a usual alternating current source 10 which may, for example, be the alternating current main. A bridge rectifier 12 is connected to the source 10 in a manner to produce a unidirectional voltage across the terminals 14 and 16. A series limiting resistor 20 may be connected to the terminal 14, so as to minimize the current through the circuit under minimum load conditions. In a particular constructed embodiment, for example, the limiting resistor has a value of the order of 1.5 kilo-ohms. However, the value of the limiting resistor, naturally is dictated by the parameters of the particular circuit. The bridge rectifier is shunted by a usual filter capacitor 13.

The limiting resistor 20, as shown, is connected to the terminal 14, and a lead 21 extends from the terminal 14 to one of the output terminals 22. The regulated voltage appears across the output terminal 22 and a further output terminal 24. The load, designated by a resistance element 26, is connected across the output terminals 22 and 24. A Zener diode 30 which may, for example, be of the type presently designated 1N988, together with a first resistor 32 and a second resistor 34, are connected in series across the lead 21 and a common lead 23.

The resistor 32, for example, in the constructed embodiment of the invention has a value of 20 kilo-ohms, whereas the resistor 34 has a resistance of 500 ohms. In any event, the values of these resistors are chosen so that the temperature coefficients of the Zener diode and of the transistor may be balanced against one another. The common lead 23 is connected between the input terminal 16 and the output terminal 24. An NPN transistor 36 has its base connected to the junction of the resistors 32 and 34. The transistor 36 may be, for example, a Motorola transistor of the type designated MJE340. The emitter of the transistor 36 is connected to the lead 23, and its collector is connected to the lead 21.

In the operation of the circuit of FIG. 2, whenever the regulated voltage rises above the breakdown threshold of the Zener diode 30, the Zener diode breaks down and passes current. However, instead of the bulk of the energy being absorbed by the Zener diode 30, the breakdown of the Zener diode causes the transistor 36 to become conductive, so that the transistor actually absorbs the major portion of the energy. This means that the current swing through the Zener diode 30 is within a relatively small range during the voltage regulation process, so that its adverse surface characteristics can be tolerated.

The resistors 32 and 34 have selected values, as mentioned, so that the positive temperature coefficient of the Zener diode 30 may be balanced against the negative temperature coefficient of the emitter-base junction of the transistor 36. In this manner, the system is relatively stable in the presence of any heating of the Zener diode 30 or of the transistor 36.

It will be appreciated that the emitter and collector electrodes of the transistor 36 are the active terminals of the network. For applied voltages less than the breakdown voltage of the Zener diode 30, the only collector current which flows through the transistor 30 is that due to the reverse current of the collector-base junction of the transistor. The resistor 34 provides a return path for this current so that it is not injected into the base-emitter junction of the transistor. In fact, no base-emitter current is injected into the transistor 36 until the breakdown voltage of the diode 30 is exceeded by the amount necessary to cause a current to flow capable of producing approximately 0.6 volt across the resistor 34, for example. As this value of applied voltage is reached, current is injected into the base-emitter junction of the transistor, and this results in a collector-emitter current through the transistor which is beta times as great as the original current; "beta" being the current amplification of the transistor.

When the beta of the transistor is relatively large, only a very small current, close to that associated with the original breakdown voltage required to inject base current in the transistor, ever flows through the Zener diode 30. Therefore, a small portion of the breakdown characteristic of the Zener diode 30 is effectively amplified by the beta of the transistor 36.

Since the beta of the usual transistor seldom exceeds 100 over a reasonable current range, the simple circuit of FIG. 2 results in only a factor of 100 or less dynamic impedance improvement over that of the Zener diode 30 alone. Should a greater improvement be required, a "Darlington" connection of two transistors, such as shown in the circuit of FIG. 3 may be used. The circuit of FIG. 3 is generally similar to that of FIG. 2, and like elements have been designated by the same numbers.

In the circuit of FIG. 3, the collector of the transistor 36 is connected back to the junction between the Zener diode 30 and resistor 32, whereas the emitter is connected to the base of a further transistor 100. The collector of the transistor 100 is connected to the lead 21, and its emitter is connected to the common lead 23. As mentioned, the transistors 36 and 100 are connected as a modified Darlington amplifier, so that any breakdown current from the Zener diode 30 is materially amplified to provide a more sensitive voltage regulating action, and further to enhance the immunity of the system to temperature changes. The amplification in the circuit of FIG. 3 is the beta of the transistor 36 times the beta of the transistor 100. In this case, for the normal type transistor characteristics, the improvement is limited only by the emitter spreading resistance in the transistors, which is less than 30 ohms for one milliampere in a typical transistor.

Of course, many other variations of the basic circuit of FIG. 2 are possible. For example, a third transistor could be added in a "compound Darlington" configuration for even high effective amplification of the breakdown characteristic of the Zener diode. Moreover, transistors could be added in parallel with the final current carrying transistor to extend the current and power handling capabilities of the circuit.

As described above, the temperature characteristics of the voltage regulating circuits of FIGS. 2 and 3 are controlled by a proper choice of the values of the resistors 32 and 34, so that the positive temperature coefficient of the Zener diode 30 may be matched against the negative temperature coefficient of the emitter-base junction of the transistor 36. The temperature characteristic of the circuit could be further controlled through the use of temperature sensitive resistors, such as thermistors, or the like.

The circuit of the present invention is advantageous in that it uses standard and readily available components, and in that it is exceedingly simple in its concept and inexpensive in its construction. The circuit has the advantage of providing an effective voltage regulation for the higher voltages. The circuit also permits thermal isolation of the low and high power components. For ease of large scale manufacture, either monolithic integrated circuits may be used, or a hybrid of monolithic and thin film, or discrete components may be used.

The invention provides, therefore, an improved solid state regulating circuit which is exceedingly simple in its concept, and which is relatively inexpensive. The solid state voltage regulator circuit of the present invention may be used to regulate voltages in the range, for example, of 100–500 volts, and may be used as a replacement for the usual gas-type regulator tube. When so used, the circuit of the invention has the advantage in that it has almost unlimited life, as compared with the limited operational life of the gas regulator tube, and yet operates effectively and with high sensitivity, to perform its voltage regulating function.

As indicated above, although particular examples of the circuit of the present invention have been shown and described, modifications may be made, and it is intended to cover all modifications which come within the scope of the invention in the following claims.

What is claimed is:

1. A voltage regulator circuit including: a source of unregulated unidirectional voltage; a Zener diode exhibiting a positive temperature coefficient, and first and second resistors, all connected in series across said source; first transistor means having an emitter-base junction exhibiting a negative temperature coefficient and including a collector connected to one side of said source, an emitter connected to the other side of said source, and a base; and means connecting said base to the junction of said first and second resistors, the values of said first and second resistors being chosen to balance said negative and positive temperature coefficients, said connecting means including second transistor means having a base connected to said junction of said first and second resistors, a collector connected to the junction of said Zener diode and said first resistor, and an emitter connected to the base of said first transistor means.

2. The circuit defined in claim 1, in which said first and second transistor means are NPN transistors.

References Cited

UNITED STATES PATENTS 3,227,942   1/1966   Bunch et al.

OTHER REFERENCES

RCA Transistor Manual, Technical Series SC–11, June 1964, pp. 367, 368.

J D MILLER, Primary Examiner

A. D. PELLINEN, Assistant Examiner

U.S. Cl. X.R.

323—39